(12) United States Patent
Inoue

(10) Patent No.: US 11,070,688 B2
(45) Date of Patent: Jul. 20, 2021

(54) INFORMATION PROCESSING APPARATUS, METHOD FOR CONTROLLING THE SAME, AND STORAGE MEDIUM FOR DISPLAYING A MENU SCREEN FOR USING DESTINATION INFORMATION OF A DESTINATION

(71) Applicant: CANON KABUSHIKI KAISHA, Tokyo (JP)

(72) Inventor: Katsuhiro Inoue, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/557,112

(22) Filed: Aug. 30, 2019

(65) Prior Publication Data

US 2020/0084327 A1 Mar. 12, 2020

(30) Foreign Application Priority Data

Sep. 11, 2018 (JP) .............................. JP2018-170079

(51) Int. Cl.
*H04N 1/00* (2006.01)
*H04N 1/32* (2006.01)
*G06F 3/12* (2006.01)

(52) U.S. Cl.
CPC ....... *H04N 1/00482* (2013.01); *G06F 3/1205* (2013.01); *G06F 3/1274* (2013.01); *H04N 1/00424* (2013.01); *H04N 1/00427* (2013.01); *H04N 1/32096* (2013.01)

(58) Field of Classification Search
CPC ................................................. H04N 1/00482
USPC ........................................................ 358/1.15
See application file for complete search history.

(56) References Cited

U.S. PATENT DOCUMENTS

| 2012/0068935 | A1* | 3/2012 | Mutoh | ............... H04N 1/00411 345/168 |
| 2012/0243016 | A1* | 9/2012 | Amano | ................ G06K 15/005 358/1.13 |
| 2015/0022867 | A1* | 1/2015 | Morita | ................. H04N 1/0001 358/405 |
| 2020/0028982 | A1* | 1/2020 | Tose | .................... H04N 1/00474 |
| 2020/0034097 | A1* | 1/2020 | Omori | ..................... G06F 3/048 |

FOREIGN PATENT DOCUMENTS

JP 2015-22651 A 2/2015

\* cited by examiner

*Primary Examiner* — Jacky X Zheng
(74) *Attorney, Agent, or Firm* — Canon U.S.A., Inc. IP Division

(57) ABSTRACT

In a case where a setting content includes a destination to which an output product output by executing one application is to be transmitted, and in a case where a software key is selected, a menu screen including at least two of a first item for executing the application using the destination, a second item for executing the application using a setting content, and a third item for executing the application corresponding to a second software key based on the setting content is displayed.

16 Claims, 12 Drawing Sheets

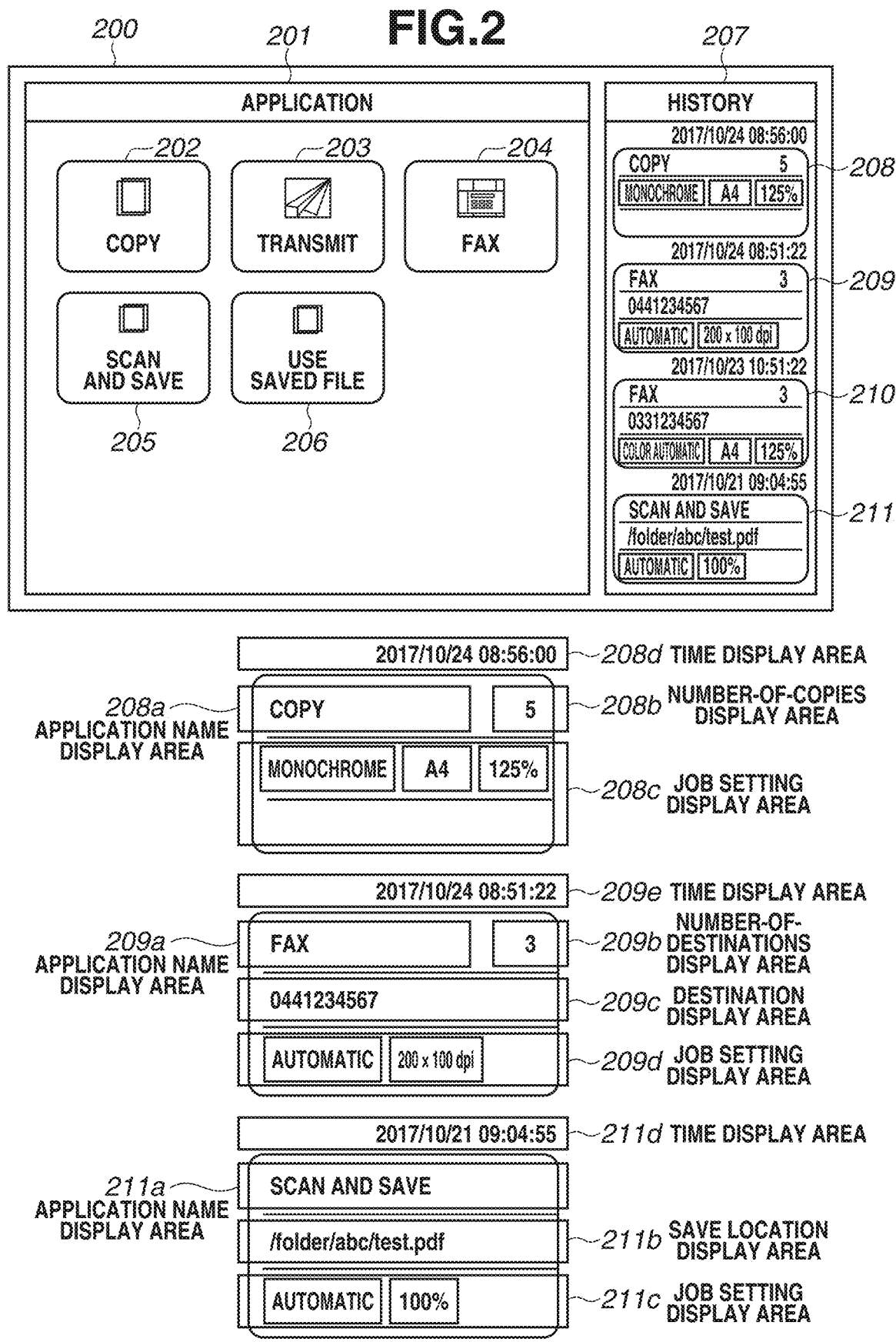

FIG.3

| HISTORY ID | APPLICATION TYPE | PREVIOUS EXECUTION DATE AND TIME | SETTING CONTENTS |
|---|---|---|---|
| 1 | COPY | 2017/10/24 08:56:00 | NUMBER OF COPIES/5<br>COLOR MODE/MONOCHROME<br>SHEET SIZE/A4<br>MAGNIFICATION/125%<br>SIDES/TWO SIDES TO TWO SIDES<br>PAGE AGGREGATE/1 IN 1<br>DENSITY/NORMAL<br>STAPLING/ABSENT |
| 2 | FAX | 2017/10/24 08:51:22 | NUMBER OF DESTINATIONS/5<br>DESTINATION TYPE/NEW DESTINATION<br>DESTINATION ID/ABSENT<br>DESTINATION/0441234567, 0331234567, 0661234567<br>RESOLUTION: 400 × 400<br>COLOR MODE/MONOCHROME<br>SHEET SIZE/A4<br>MAGNIFICATION/100%<br>SIDES/ONE SIDE TO ONE SIDE<br>DENSITY/HIGH |
| 3 | FAX | 2017/10/23 10:51:22 | NUMBER OF DESTINATIONS/3<br>DESTINATION TYPE/ADDRESS BOOK<br>DESTINATION ID/1, 2, 3<br>DESTINATION/<br>RESOLUTION: 400 × 400<br>COLOR MODE/AUTOMATIC<br>SHEET SIZE/AUTOMATIC<br>MAGNIFICATION/100%<br>SIDES/ONE SIDE TO TWO SIDES<br>DENSITY/HIGH |
| 4 | SCAN AND SAVE | 2017/10/21 09:04:55 | NUMBER OF SAVED IMAGES/<br>COLOR MODE/COLOR<br>SHEET SIZE/A4<br>MAGNIFICATION/100%<br>SIDES/TWO-SIDED OUTPUT<br>DENSITY/NORMAL |
| 5 | COPY | 2017/10/19 16:46:58 | NUMBER OF COPIES/6<br>COLOR MODE/AUTOMATIC<br>SHEET SIZE/B5<br>MAGNIFICATION/AUTOMATIC<br>SIDES/ONE SIDE TO TWO SIDES<br>PAGE AGGREGATE/1 IN 1<br>DENSITY/HIGH |
| 6 | TRANSMIT | 2017/10/17 12:23:05 | NUMBER OF DESTINATIONS/1<br>DESTINATION TYPE/NEW DESTINATION<br>DESTINATION ID/ABSENT<br>DESTINATION/abc@bcd.com<br>RESOLUTION: 300 × 300<br>COLOR MODE/MONOCHROME<br>SHEET SIZE/A4<br>MAGNIFICATION/100%<br>SIDES/ONE SIDE TO ONE SIDE<br>DENSITY/NORMAL |

301 302 303 304 — 300

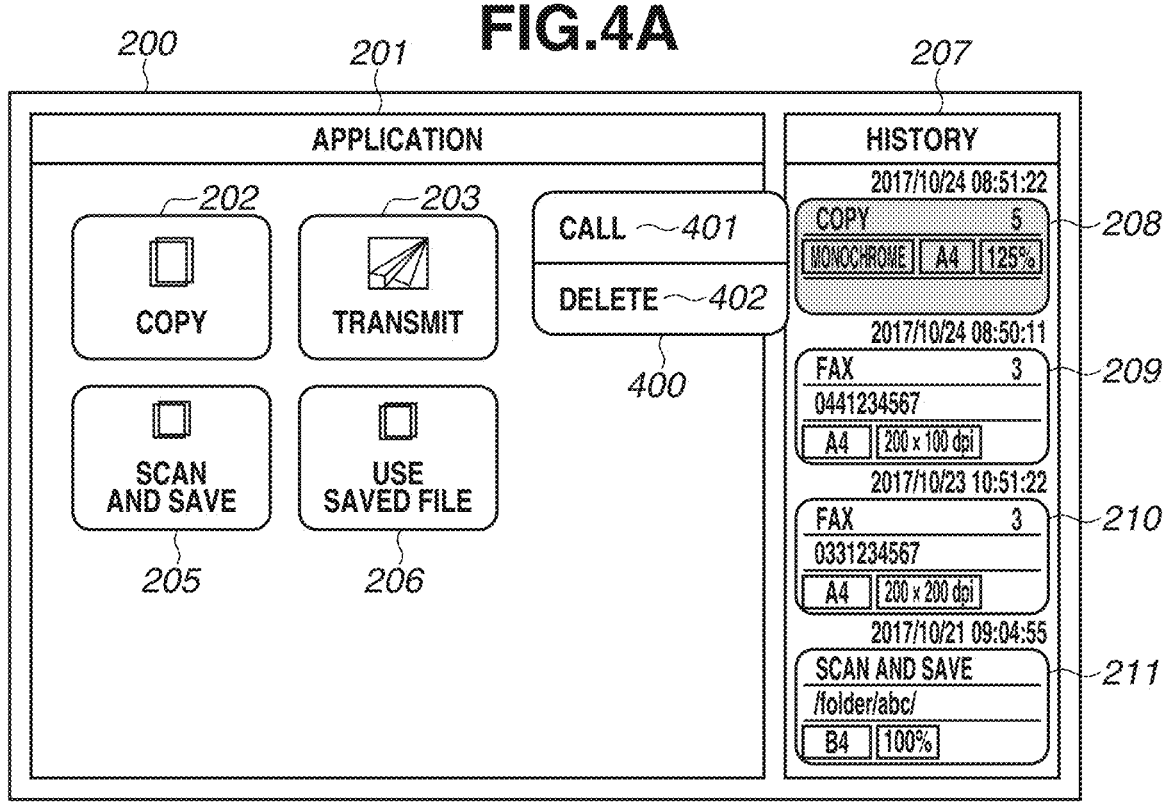
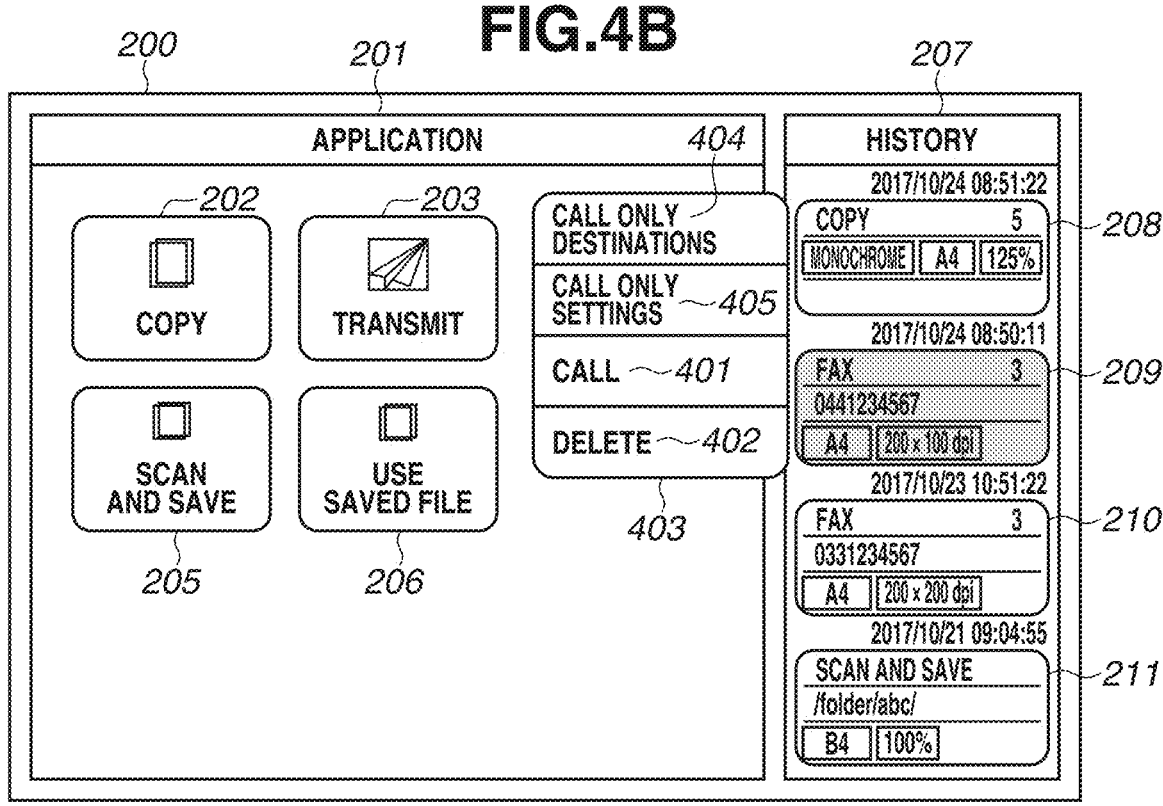

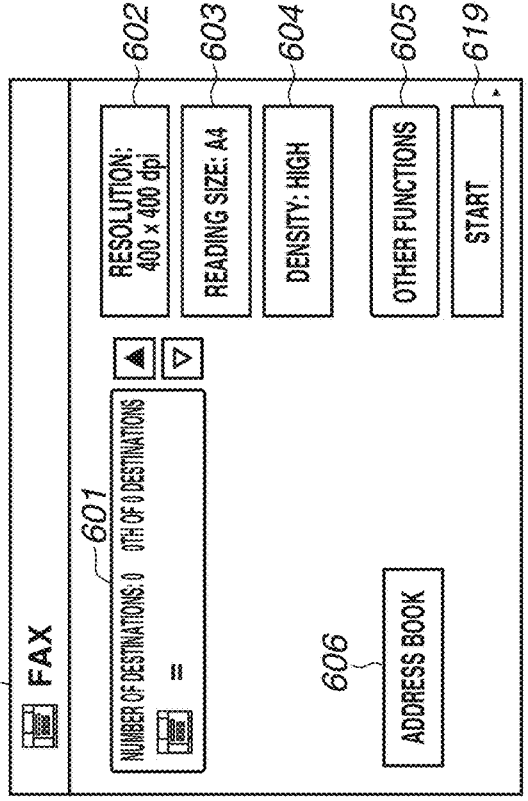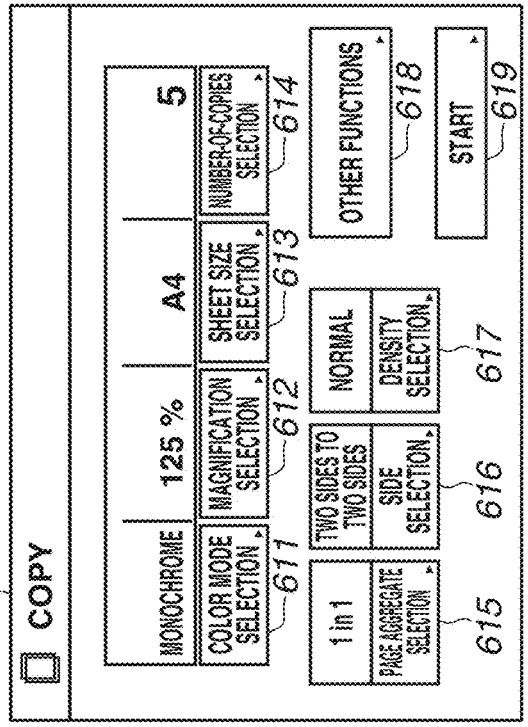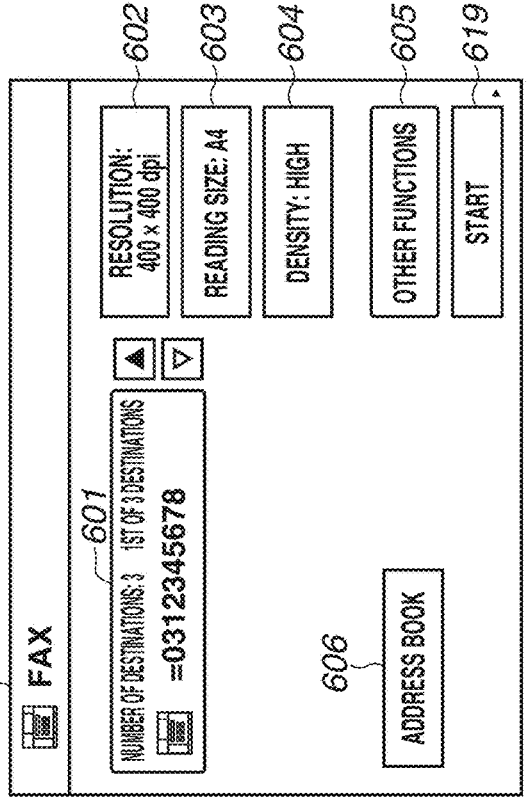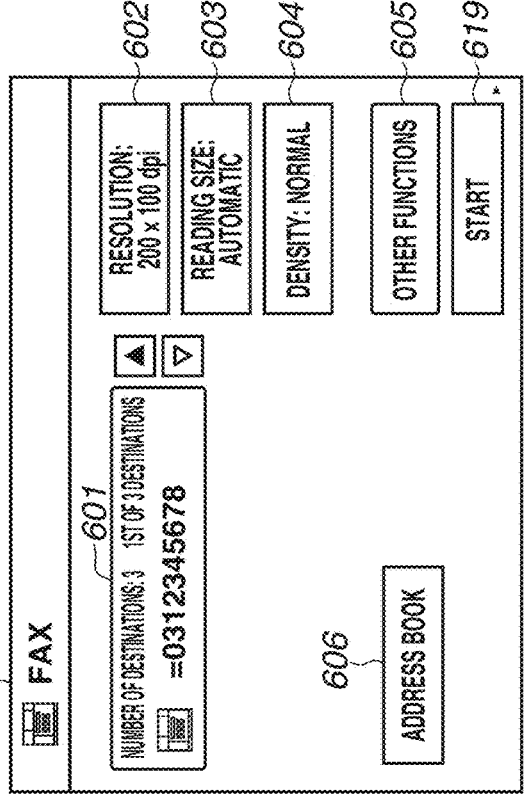

DESTINATION ERROR SCREEN 800

SELECTED DESTINATION DOES NOT EXIST.

OK — 801

ADDRESS BOOK 820

| DESTINATION ID 821 | APPLICATION TYPE 822 | DESTINATION 823 |
|---|---|---|
| 1 | FAX | 0441234567 — 824 |
| 2 | FAX | 0331234567 |
| 3 | FAX | 0661234567 |
| 4 | FAX | 0111234567 |
| 5 | FAX | 0221234567 |
| 6 | FAX | 0331234567 |
| 7 | SCAN AND SAVE | /folder/abc/ — 825 |
| 8 | TRANSMIT (EMAIL) | test@abc.com — 826 |
| 9 | | |

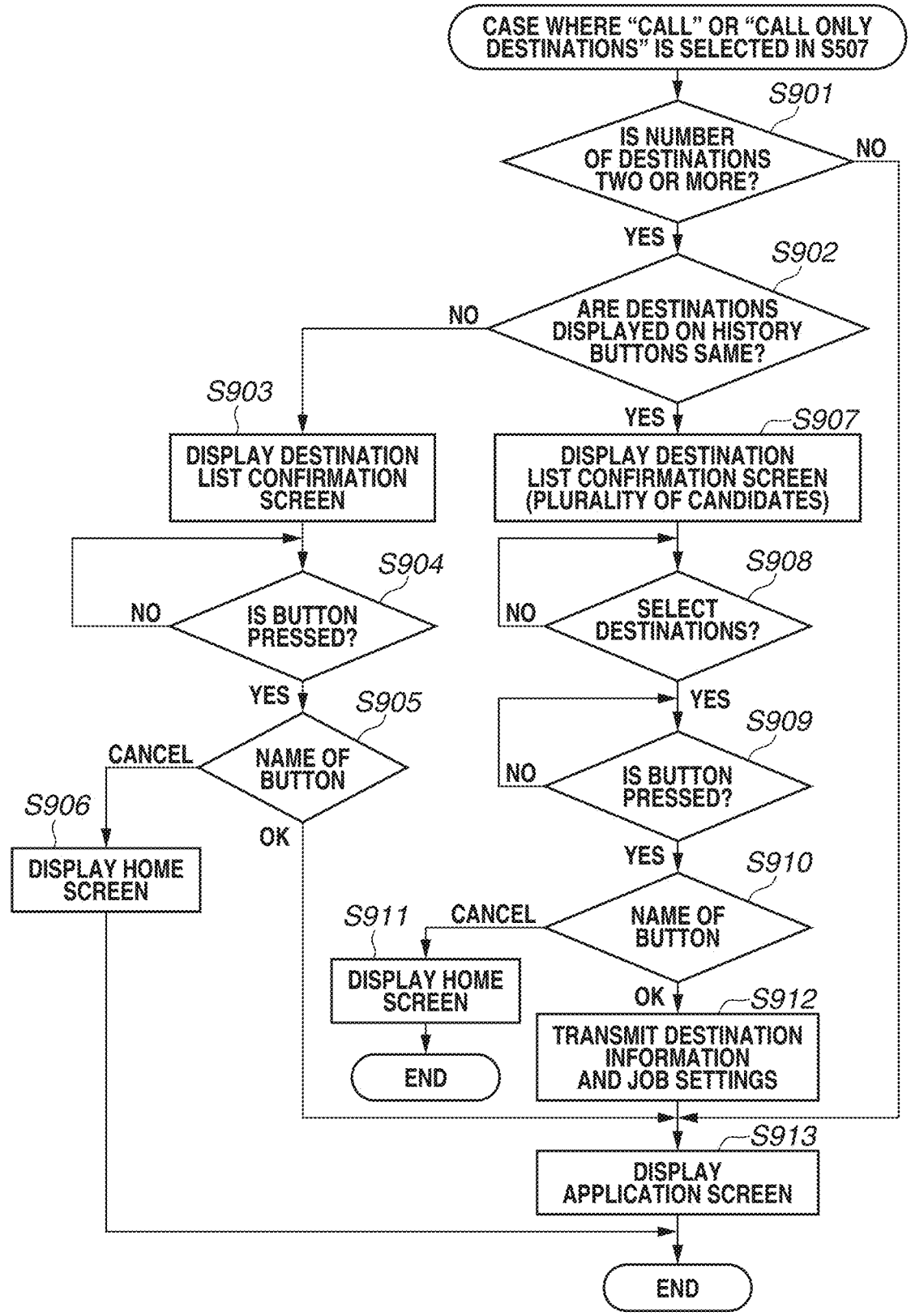

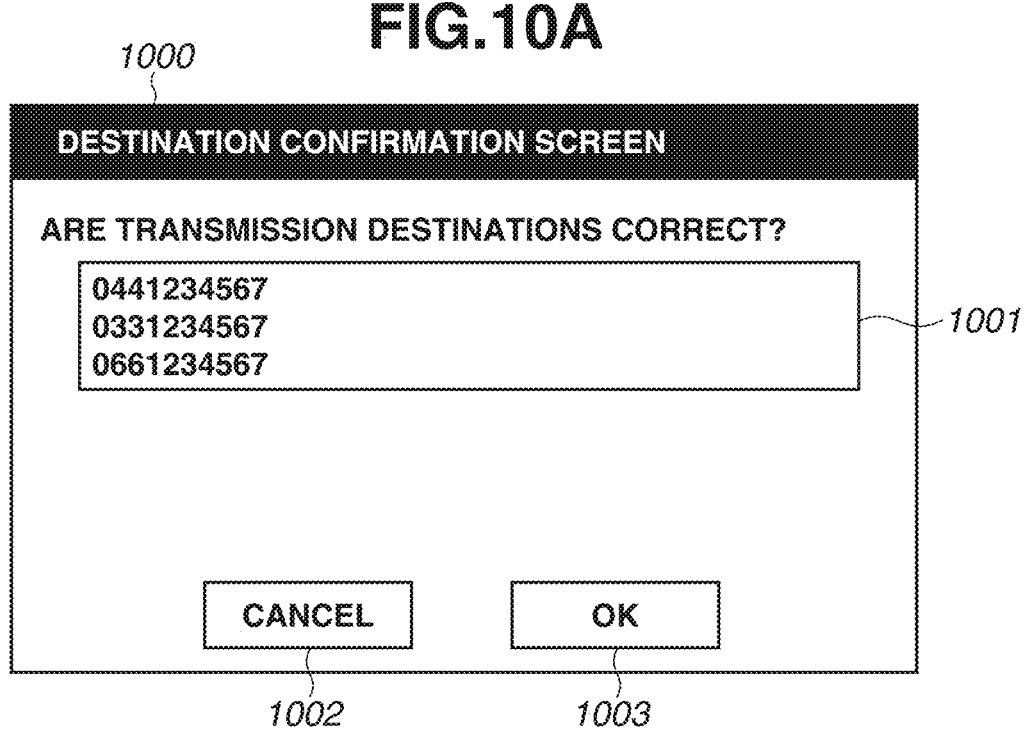
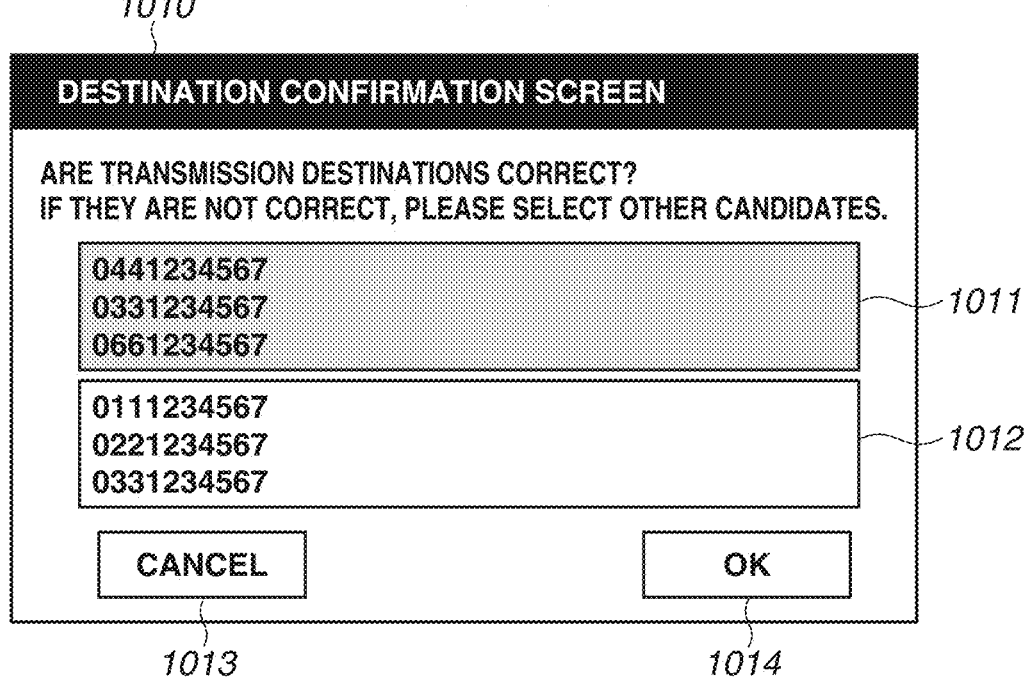

INFORMATION PROCESSING APPARATUS, METHOD FOR CONTROLLING THE SAME, AND STORAGE MEDIUM FOR DISPLAYING A MENU SCREEN FOR USING DESTINATION INFORMATION OF A DESTINATION

BACKGROUND OF THE INVENTION

Field of the Invention

The aspect of the embodiments relates to an information processing apparatus, a method for controlling the same, and a storage medium.

Description of the Related Art

When a process such as a print process is executed in an image processing apparatus such as a multifunction peripheral (MFP), setting contents such as a sheet size, the number of copies, and monochrome printing are input to the image processing apparatus. To save the trouble of inputting setting contents every time a process is executed, Japanese Patent Application Laid-Open No. 2015-22651 discusses a document management system for displaying operation histories as a timeline (a history timeline). The history timeline is displayed embedded in an existing screen of a display operation panel. If an item included in the history timeline is pressed, an application screen corresponding to one of the operation histories is displayed. An execution button on the application screen is pressed, whereby a process is executed based on the settings of the operation history selected on the history timeline.

SUMMARY OF THE INVENTION

According to an aspect of the disclosure, an apparatus having a plurality of applications includes a first display configured to display a software key generated according to selection of one application included in the plurality of applications and execution of a job, the software key being used to execute the application again by a user operation based on a setting content of the executed job, and a second display configured to, in a case where the setting content includes a destination to which an output product output by executing the one application is to be transmitted, and in a case where the software key is selected by an operation different from the user operation, display a menu screen including at least two of a first item for executing the application using the destination, a second item for executing the application using a setting content, and a third item for executing the application corresponding to a second software key based on the setting content.

Further features of the disclosure will become apparent from the following description of exemplary embodiments with reference to the attached drawings.

BRIEF DESCRIPTION OF THE DRAWINGS

FIG. 2 is a diagram illustrating an example of a display screen of a home screen according to the first exemplary embodiment of the disclosure.

FIG. 3 is a diagram illustrating an example of history information stored in a random-access memory (RAM) or a read-only memory (ROM) according to the first exemplary embodiment of the disclosure.

FIGS. 4A and 4B are diagrams illustrating examples of a history menu display screen according to the first exemplary embodiment of the disclosure.

FIGS. 6A, 6B, 6C, and 6D are diagrams illustrating examples of an application screen according to the first exemplary embodiment of the disclosure.

FIG. 9 is an operation flow of processing from when a button of a setting history including a plurality of destinations is pressed to when a job is executed, according to a third exemplary embodiment of the disclosure.

FIGS. 10A and 10B are diagrams illustrating examples of a destination confirmation screen according to the third exemplary embodiment of the disclosure.

DESCRIPTION OF THE EMBODIMENTS

As a process executed in the image processing apparatus, there is also a process that requires the setting of the destination of a job, in addition to the above print process. Specific examples of the process include a fax process and the process of transmitting scanned data to an external apparatus. In a case where these processes are executed, the setting contents include destinations.

When a process corresponding to an operation history is executed using the same setting contents as the operation history, a corresponding item on a timeline may be pressed. Some user, however, also wishes to reflect only the setting contents (hereinafter execution conditions) other than the destination of the operation history, or wishes to reflect only the destination of the operation history. In a case where the setting contents can be changed on an application screen displayed after the timeline is selected, only the execution conditions or only the destination is to be changed, which is troublesome.

The aspect of the embodiments is directed to, when an operation history for requiring the setting of the destination of a job and execution conditions is selected from a timeline, allowing the selection of whether to reflect only the destination of the operation history or only the execution conditions on setting contents.

With reference to the drawings, an information processing apparatus used in exemplary exemplary embodiments of the disclosure will be described. The following exemplary embodiments do not limit the invention according to the appended claims, and not all the combinations of the features described in the exemplary embodiments are essential for a method for solving the issues in the invention.

First, a first exemplary embodiment according to the disclosure will be described.

<Network Configuration Diagram>

Figure 11:
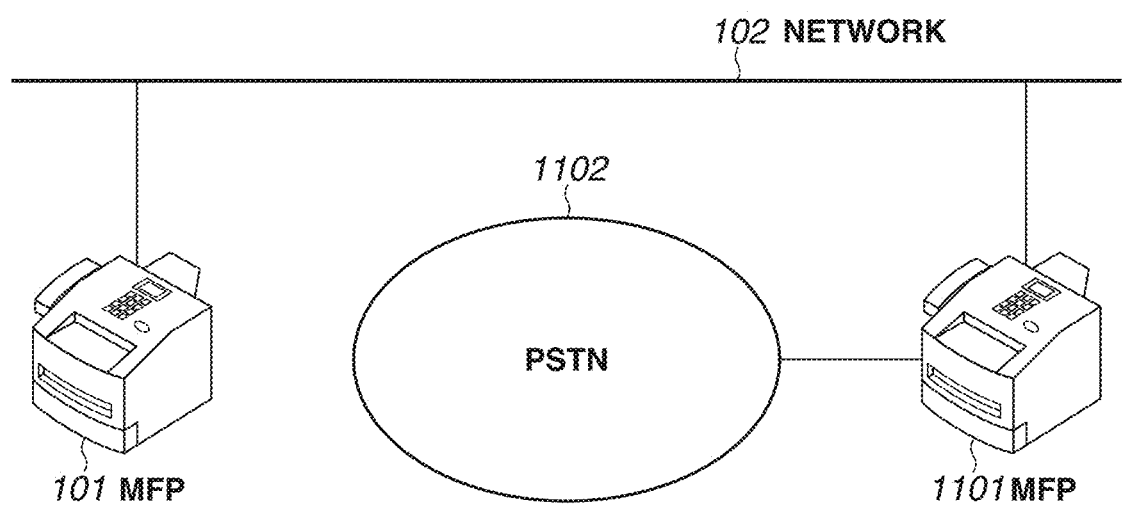
FIG. 11 is a conceptual diagram illustrating a configuration of a network to which the information processing apparatus according to the first exemplary embodiment of the disclosure is connected.

FIG. 11 is a conceptual diagram illustrating the configuration of a network to which an information processing apparatus according to the present exemplary embodiment is connected. In the disclosure, the information processing apparatus is described using a multifunction peripheral (MFP) as an example, but is not limited to the MFP. The information processing apparatus may be any device including a display screen capable of displaying a list of functions.

An MFP 101 and an MFP 1101 are connected to a network 102 and a public switched telephone network (PSTN) 1102. Although in FIG. 11, the description is given on the assumption that two MFPs are provided, three or more MFPs may be provided. There is a transmission destination to which the MFP 101 can transmit an output product of a job. That is, the transmission destination may be the MFP 1101 or an external server.

Under this connection environment, for example, the MFP 101 can perform fax communication with the MFP 1101 via the PSTN 1102. Further, the MFP 101 can transmit and receive an email and a file via the network 102. For example, in a case where the MFP 101 transmits a fax to the MFP 1101, a user inputs the telephone number of the MFP 1101 by operating a key on a touch panel 118, places a transmission document on a scanner 121, and presses a start key button, thereby transmitting a fax to the MFP 1101.

<Software Configuration Diagram>

Figure 12:
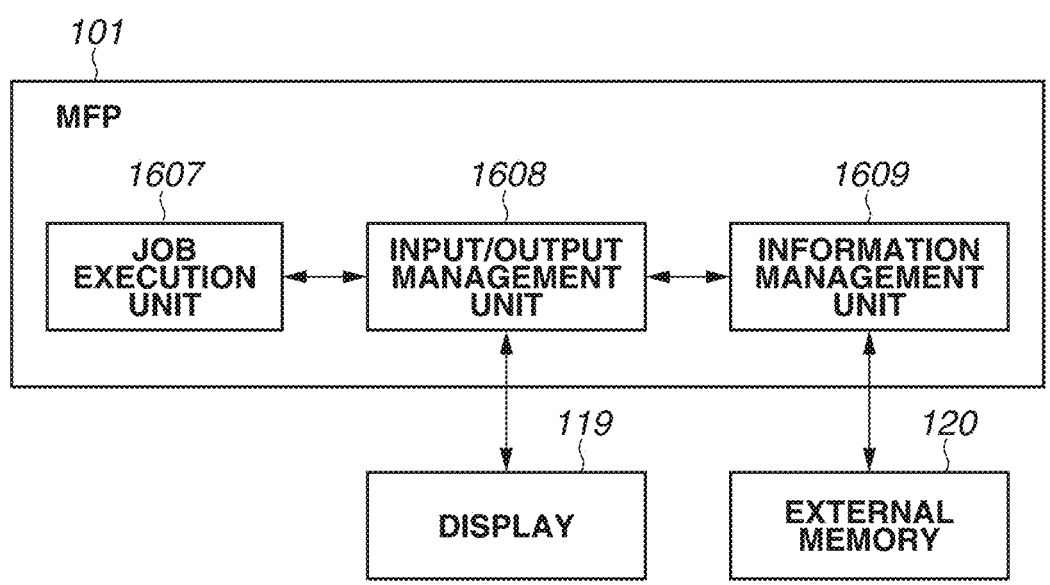
FIG. 12 is a diagram illustrating an example of a software configuration of the information processing apparatus according to the first exemplary embodiment of the disclosure.

FIG. 12 is a software configuration diagram of the MFP 101. Based on a program for an application stored in a read-only memory (ROM) 113, various functions are executed by a central processing unit (CPU) 111.

The MFP 101 includes an input/output management unit 1608, an information management unit 1609, and a job execution unit 1607. The information management unit 1609 has a function of managing information regarding a history button displayed on a home screen 200, default settings before shipment, and various setting values such as the presence or absence of a skip mode.

The job execution unit 1607 has the function of executing a job based on setting contents corresponding to a pressed history button. Specific examples of the job to be executed include a print job if the function of the selected history button is a print function, a scan job if the function of the selected history button is a scan function, and a fax job if the function of the selected history button is a fax function.

The input/output management unit 1608 has the function of, based on an input signal acquired via a display 119 (or the touch panel 118), referencing the information managed by the information management unit 1609 or transmitting an instruction to execute a job to the job execution unit 1607. Further, according to an execution process in the job execution unit 1607, the input/output management unit 1608 also controls display on the display 119.

<Hardware Configuration Diagram>

Figure 1:
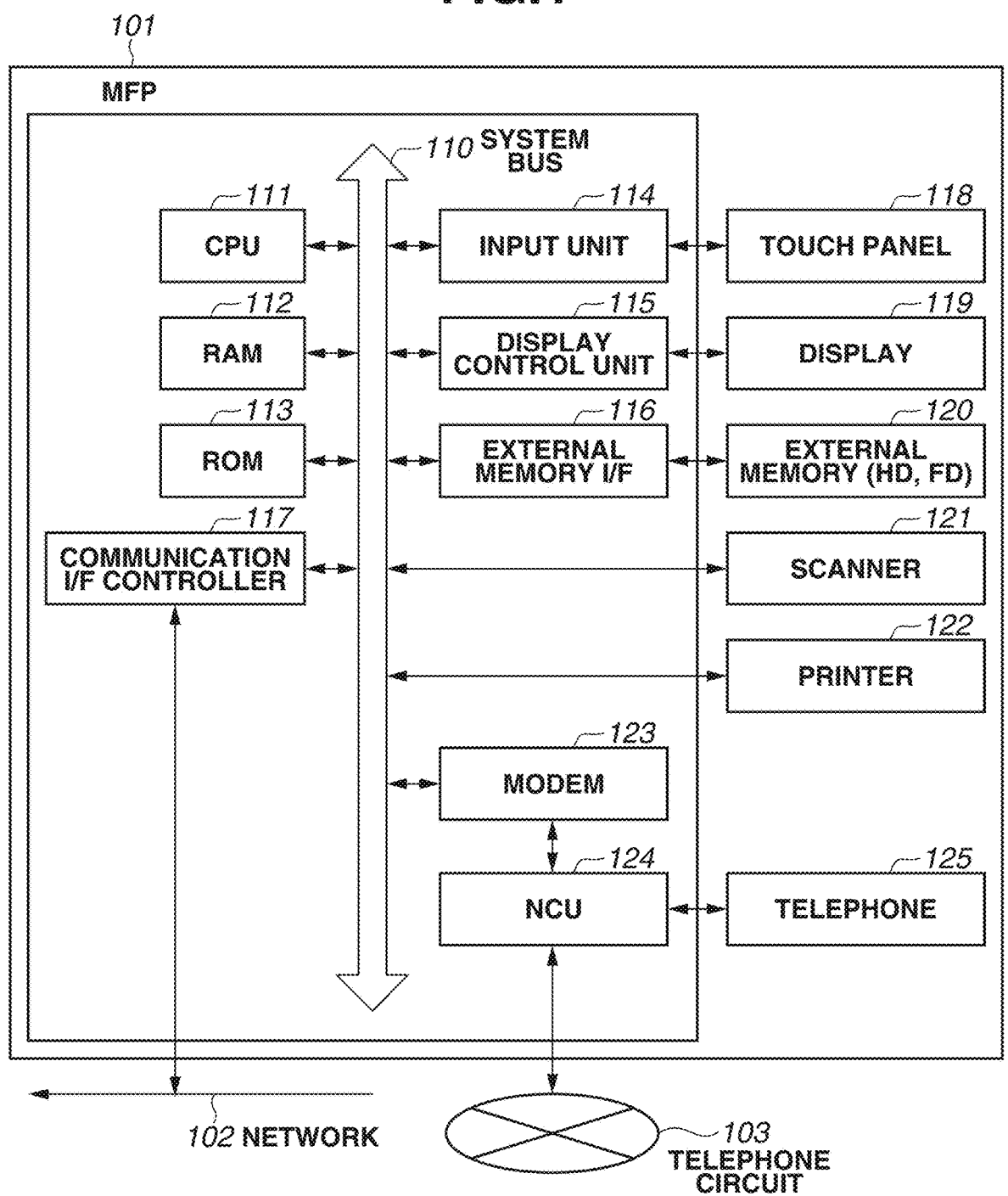
FIG. 1 is a diagram illustrating an example of a hardware configuration of an information processing apparatus according to a first exemplary embodiment of the disclosure.

FIG. 1 is a diagram illustrating an example of the hardware configuration of the information processing apparatus according to the present exemplary embodiment. In FIG. 1, the information processing apparatus is described taking the MFP 101 as an example. The same applies to the MFP 1101 and an external server other than the MFP 1101. The MFP 101 includes the CPU 111, a random-access memory (RAM) 112, the ROM 113, an input unit 114, a display control unit 115, an external memory interface (I/F) 116, a communication I/F controller 117, the touch panel 118, the display 119, an external memory 120, the scanner 121, a printer 122, a modem 123, a network control unit (NCU) 124, and a telephone 125. The CPU 111, the RAM 112, the ROM 113, the input unit 114, the display control unit 115, the external memory I/F 116, the communication I/F controller 117, and the modem 123 are connected to a system bus 110. Further, the touch panel 118, the display 119, and the external memory 120 are connected to the system bus 110. These processing units are configured to exchange data with each other via the system bus 110.

The ROM 113 stores image data, other pieces of data, and a control program for the CPU 111. The control program is a control program for executing the exemplary embodiments described below. Further, examples of the type of the ROM 113 include a rewritable flash ROM. The ROM 113 also stores setting values registered by the user of the MFP 101 and management data. The RAM 112 is a volatile memory and stores a program control variable, a buffer for various works, some setting values registered by the user of the MFP 101, and management data. Furthermore, the RAM 112 is also used as a temporary storage area such as a main memory or a work area for the CPU 111. For example, according to a program stored in the ROM 113, the CPU 111 controls the components of the MFP 101 using the RAM 112 as a work memory. A program for the operation of the CPU 111 may be stored not only in the ROM 113 but also in the external memory (hard disk) 120 in advance. The RAM 112, the ROM 113, and the external memory 120 are collectively referred to as a "storage area".

The input unit 114 receives a user operation, generates a control signal based on the operation, and supplies the control signal to the CPU 111. For example, the input unit 114 receives a user operation from a keyboard (not illustrated), a mouse (not illustrated), or the touch panel 118 that functions as an input device. The touch panel 118 is, for example, an input device configured to output coordinate information based on a position where an input portion formed in a planar manner is touched. Based on a control signal generated by the input unit 114 according to the user operation performed on the input device and supplied to the CPU 111, the CPU 111 controls the components of the MFP 101 according to a program. Consequently, the MFP 101 can operate according to the user operation.

The display control unit 115 outputs a display signal for displaying an image on the display 119. For example, the CPU 111 supplies a display control signal generated based on a program to the display control unit 115. The display control unit 115 generates a display signal based on the display control signal and outputs the display signal to the display 119. For example, based on the display control signal generated by the CPU 111, the display control unit 115 displays on the display 119 a graphical user interface (GUI) screen where a GUI is configured.

The touch panel 118 is formed integrally with the display 119 and also functions as an operation unit. For example, a manufacturer configures the touch panel 118 such that the transmittance of light does not hinder display on the display 119. Then, the manufacturer attaches the touch panel 118 on an upper layer of the display surface of the display 119. Then, the manufacturer associates input coordinates on the touch panel 118 with display coordinates on the display 119. This configures a GUI that enables the user to directly operate a screen displayed on the display 119.

To the external memory I/F 116, the external memory 120 such as a hard disk, a solid-state drive (SSD), a compact disc (CD), a digital versatile disc (DVD), or a memory card can be attached. Based on control of the CPU 111, the external memory I/F 116 reads data from the attached external memory 120 and writes data to the external memory 120. Based on control of the CPU 111, the communication I/F controller 117 performs communication via the network 102 such as a local area network (LAN), the Internet, a wired network, or a wireless network. Various apparatuses such as a personal computer (PC), another MFP, a printer, and a server are connected to the network 102 so that the apparatuses can communicate with the MFP 101.

The scanner 121 reads a document and generates image data. Based on an instruction from the user input through the input unit 114 or a command input from an external apparatus via the communication I/F controller 117, the printer 122 executes a print process.

The modem 123 demodulates a modulated signal received from a telephone circuit 103, or conversely, modulates a signal from the apparatus and sends the modulated signal to the telephone circuit 103. The NCU 124 corresponds to an interface portion between the telephone circuit 103 and a fax machine. The NCU 124 performs circuit control to detect a signal from the telephone circuit 103 and transmit the detected signal to the modem 123, or to switch the telephone circuit 103 to the fax machine or the telephone 125.

<Application Buttons on Home Screen>

FIG. 2 is an example of a screen illustrating a home screen displayed on the display 119 of the MFP 101. The home screen 200 illustrated in FIG. 2 is a screen that displays software keys (application buttons 202 to 206 and history buttons 208 to 211). The home screen 200 includes an application display area 201 and a history display area 207.

The application display area 201 is an area where the plurality of application buttons 202 to 206 is displayed. In FIG. 2, as examples, the "copy" application button 202, the "transmit" application button 203, the "fax" application button 204, the "scan and save" application button 205, and the "use saved file" application button 206 are displayed.

The application buttons 202 to 206 are buttons for starting applications. If receiving the pressing of these buttons from the user, the CPU 111 starts applications associated with the respective buttons. Specifically, the application buttons 202 to 206 are pressed, whereby a copy process, a fax process, a scan process, and the like corresponding to the display of the application buttons 202 to 206 are executed. The number of application buttons and functions to be executed by pressing the respective application buttons do not particularly matter.

<History Buttons on Home Screen>

The history display area 207 in FIG. 2 is an area where a plurality of history buttons is displayed. In FIG. 2, as examples, the four history buttons 208 to 211 are displayed. If an upward flick operation is executed on the history display area 207, history buttons (not illustrated) that are not displayed in FIG. 2 are displayed in a scrolling manner. Scroll display also enables the display of history buttons outside the history display area 207 and other than the currently displayed history buttons 208 to 211.

The history buttons 208 to 211 are buttons for displaying the operation histories of jobs executed in the past. The "jobs" as used herein refer to the units of processes to be executed in the MFP 101. For example, a "print job" refers to a process in which a print product is output under particular execution conditions. The CPU 111 stores a plurality of operation histories of jobs. Based on history information 300 corresponding to the operation histories, the CPU 111 displays the history buttons 208 to 211. By pressing the history buttons 208 to 211, the user can easily call operation contents set in the past.

Further, in the areas of the history buttons 208 to 211, particular items in the history information 300 associated with the history buttons 208 to 211 are displayed. With respect to each application, it may be determined which items are to be displayed on a history button.

The details are described using the history button 208 as an example. In an application name display area 208(a) on the history button 208, the application type "copy" is displayed. In a number-of-copies display area 208(b), the number of copies "5" is displayed. Further, in a job setting display area 208(c), the color mode "monochrome", the sheet size "A4", and the magnification "125%" are displayed. In a time display area 208(d), the previous execution date and time "2017/10/24 08:56:00" is displayed. As described above, in the case of a print process, which requires only execution conditions, all or some of execution conditions set in the past are displayed on the history button.

A history button for a process that requires the destination of a job in addition to execution conditions is described using the history buttons 209 and 211 as examples.

In the case of the history button 209 for fax transmission, in an application name display area 209(a), the application type "fax" is displayed. In a number-of-destinations display area 209(b), the number of destinations "3" is displayed. In a destination display area 209(c), the destination of a job is displayed, but if a plurality of destinations is present, only some of the plurality of destinations are displayed. In a job setting display area 209(d), the sheet size "automatic" and the resolution "200×100 dpi" are displayed. Further, in a time display area 209(e), the previous execution date and time "2017/10/21 08:51:22" is displayed.

In the case of the history button 211 for a scan-and-save process, in an application name display area 211(a), the application type "scan and save" is displayed. In a save location display area 211(b), the save location "/folder/abc/test.pdf" is displayed. Further, in a job setting display area 211(c), the sheet size "automatic" and the magnification "100%" are displayed. In a time display area 211(d), the previous execution date and time "2017/10/21 09:04:55" is displayed.

As described above, in the case of a fax process or a scan-and-save process, which requires the setting of execution conditions and a destination, all or some of execution conditions set in the past and all or some of destinations set in the past are displayed on the history button. The placement of areas on the history button does not particularly matter. In these examples, the execution date and time of the history operation, the application name, the destination, and the execution conditions are placed in order from an upper portion of the area of the history button.

If a job is executed, the setting contents of the job are automatically registered as a history button, and these history buttons are displayed in reverse chronological order of the execution date and time from an upper portion of the history display area 207. If, however, the executed job has the same history information (the setting conditions, the destination, and the application type) as a job already registered as a history button, the execution date and time of the existing history button is updated, and the history button is not newly registered.

Furthermore, the number of history buttons that can be displayed in the history display area 207 is finite. When a history button is newly generated, and if the maximum number of history buttons that can be displayed are already present in the history display area 207, a history button with the oldest previous execution date and time is deleted from the history display area 207. Then, the history buttons including the newly generated history button are displayed in the history display area 207.

<History Information>

FIG. 3 is an example of the history information 300 associated with the history buttons 208 to 211. The history information 300 is stored in the RAM 112 or the ROM 113.

The history information 300 includes a history identification (ID) 301, an application type 302, a previous execution date and time 303, and setting contents 304. These items are examples of the history information 300, and another item may be held. Further, items to be held may differ depending on the application.

The history ID 301 indicates an ID for uniquely identifying a history. The application type 302 indicates the type of an application. Examples of the type of the application include a "copy" application, a "fax" application, and a "scan and save" application. The previous execution date and time 303 indicates the last date and time when a job is executed according to the setting contents 304. The setting contents 304 include conditions for executing a process and also include a destination depending on the process.

In the examples of the setting contents 304, the setting contents 304 are described in a "key/value" hash map format. To give a description using a history with the history ID 301 "1" as an example, this job is executed based on setting contents including the number of copies "5", the color mode "monochrome", the sheet size "A4", the magnification "125%", the sides "two sides to two sides", the page aggregate "1 in 1", the density "normal", and the stapling "absent".

To give a description using a history with the history ID 301 "2" as an example, this job is executed based on setting contents including the number of destinations "3", the destination type "new destination", the destination ID "absent", the destination "0441234567, 0331234567, 0661234567", the resolution "400×400", the color mode "monochrome", the sheet size "A4", the magnification "100%", the sides "one side to one side", and the density "high".

Unlike the case of copy, in the case of fax, the setting contents 304 include destination information. The "destination information" refers to information regarding the destination of a job, and specifically, is information including at least any of the number of destinations, a destination type, a destination ID, and a destination. As the setting value of the destination type, an "address book" or "a new destination" is described. The destination type "address book" indicates that an address book is referenced when the destination of the job is set. The destination type "new destination" indicates that the destination of the job is set by manual input of the user. The destination ID is an ID for, when the destination type is the "address book", uniquely identifying a destination in the address book. If the destination type is the "new destination", the destination ID is not described, and a destination input by a user operation is set as the "destination".

As can be understood from comparison between the history buttons 208 to 211 in FIG. 2 and the history information 300 in FIG. 3, not all the pieces of history information are displayed in the areas of the history buttons 208 to 211. To give a description using the history with the history ID 301 "1" as an example, only the application type, the number of copies, the color mode, the sheet size, the magnification, and the previous execution date and time are displayed on the history button 208 associated with the history. This is because the areas of the history buttons 208 to 211 are limited, and setting items to be displayed in the areas also are to be limited.

<History Menu>

FIG. 4A is an example of a history menu to be displayed by pressing a history button. A description is given below using as an example the history button 208 associated with the history information 300 regarding the history ID 301 "1". The history menu is a menu screen to be displayed by a user operation different from a normal user operation for executing a process corresponding to a history button.

A history menu 400 includes "call" 401 and "delete" 402 as selectable items. If the "call" 401 is pressed, the CPU 111 reads the setting contents 304 and the application type 302 of the history information 300 associated with the pressed history button 208. Then, the CPU 111 transmits the setting contents 304 to an application that matches the read application type 302. The application reads the setting values of various settings from the received setting contents 304 and displays an application screen (FIG. 6D) on the display 119 in the state where the settings are reflected on the application screen.

A process to be executed by pressing the "call" 401 of the history menu 400 and a process to be executed by pressing the history button 208 without displaying the history menu 400 are the same. The same applies to a history menu 403.

If the "delete" 402 is pressed, the CPU 111 deletes the history information 300 associated with the pressed history button 208, thereby deleting the history button 208 from the history display area 207.

FIG. 4B is an example of a history menu to be displayed by pressing a history button that requires a destination. A description is given below using as an example the history button 209 associated with the history information 300 regarding the history ID 301 "2".

A history menu 403 includes "call only destinations" 404 and "call only settings" 405 in addition to the "call" 401 and the "delete" 402. Processes to be executed by pressing the "call" 401 and the "delete" 402 of the history menu 403 are basically the same as the processes to be executed by pressing the "call" 401 and the "delete" 402 of the history menu 400. However, an application screen to be displayed by pressing the "call" 401 of the history menu 403 is an application screen illustrated in FIG. 6A.

If the "call only destinations" 404 is pressed, the CPU 111 reads the destination information (the number of destinations and the destination) in the setting contents 304 and the application type 302 of the history information 300 associated with the pressed history button 209. Then, the CPU 111 transmits the read information to an application that matches the application type 302. The application reads the setting values of various settings from the received information and displays an application screen (FIG. 6B) on the display 119 in the state where the settings are reflected on the application screen. The various settings displayed in FIG. 6B are default settings, and are not settings associated with the history button 209. That is, settings such as the resolution "200×100 dpi" and the reading size "automatic" in FIG. 6B are different from the setting contents 304 of the history information 300.

If the "call only settings" 405 is pressed, the CPU 111 reads the setting contents 304 other than the destination information in the setting contents 304 and the application type 302 of the history information 300 associated with the pressed history button 209. Then, the CPU 111 transmits the read setting contents 304 to an application that matches the application type 302. The application reads the setting values of various settings from the received setting contents 304 and displays an application screen (FIG. 6C) on the display 119 in the state where the setting values are reflected on the application screen. At this time, since the CPU 111 does not read the destination information, an area 601 in FIG. 6C is in a blank state, and the destination of a job is not displayed.

The reason why items to be displayed in a history menu differs between the history buttons 208 and 209 is because the application (e.g., "copy") associated with the history button 208 does not require a destination in addition to the settings, whereas the application (e.g., "fax") associated with the history button 209 requires a destination in addition to the settings. As described above, items to be displayed in a history menu differ depending on the type of the application related to a history button.

The display method for displaying a history menu is not limited to a particular operation method. For example, a form may be employed in which a process corresponding to a history button is executed without displaying a history menu by a tap operation, and the history menu is displayed by a double-tap operation or a long press operation. Alternatively, a form may be employed in which, if a particular area (e.g., the right area) of a history button is pressed, a process corresponding to the history button is executed without displaying a history menu, and if a particular area (e.g., the left area) of the history button is pressed, the history menu is displayed. Yet alternatively, a form is also possible in which, if the pointer of a mouse is placed over a history button, a history menu is displayed, and if the history button is clicked with the mouse, a process is executed without displaying the history menu. In any of these forms, a user operation for executing a process corresponding to a history button and an operation for displaying a history menu are different user operations.

Further, items to be displayed in a history menu may include items other than those illustrated in FIGS. 4A and 4B. For example, a new item such as "register in home screen" may be provided on a history menu, thereby enabling the registration of a selected history button as an application button in the application display area 201.

<Processing from when History Button is Pressed to when Application Screen is Displayed>

Figure 5:
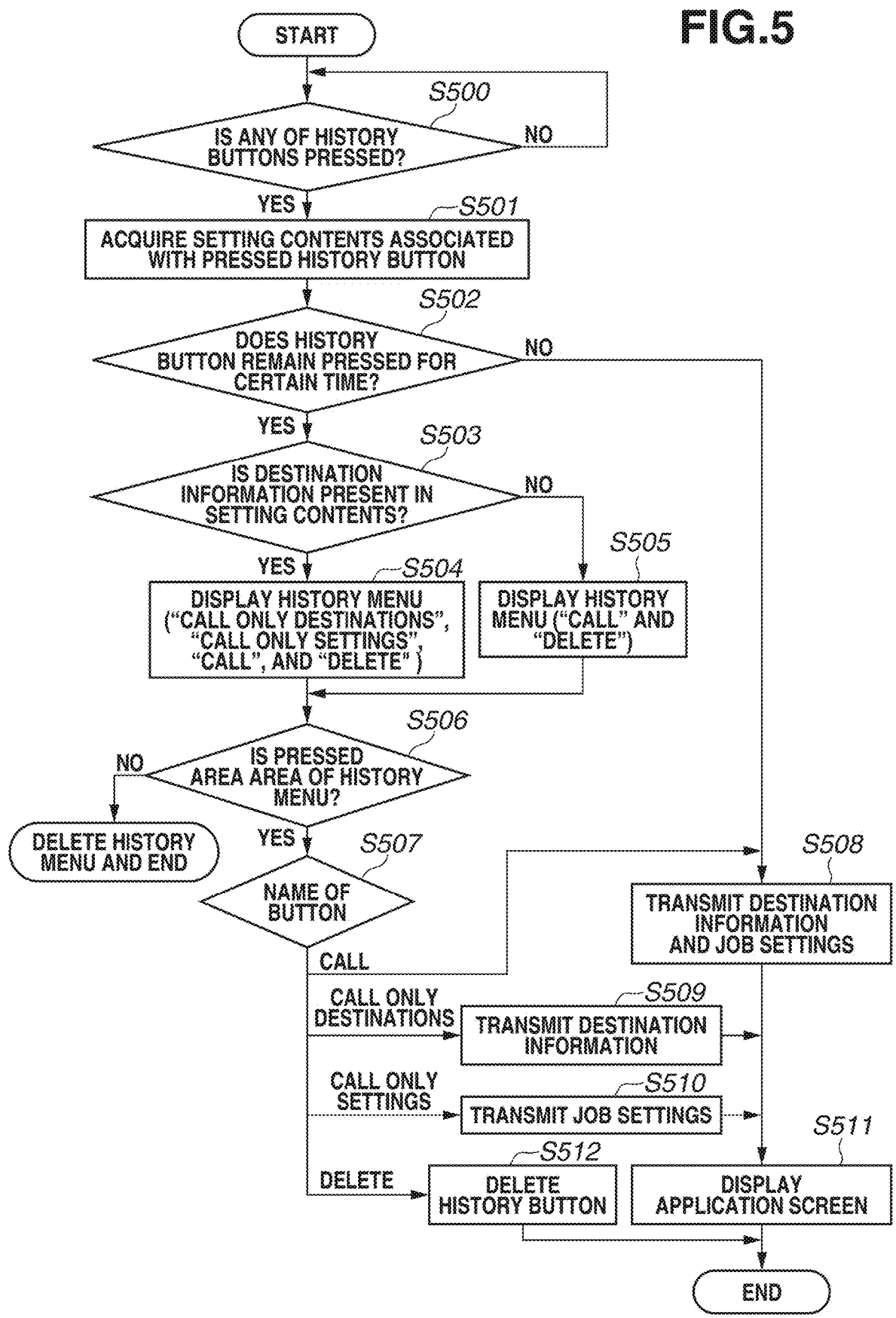
FIG. 5 is an operation flow of processing from when a history button is pressed to when a job is executed, according to the first exemplary embodiment of the disclosure.

FIG. 5 is the operation flow of processing from when any of the history buttons 208 to 211 is pressed to when a job is executed. This operation flow is executed by the CPU 111 detecting the pressing of any of the history buttons 208 to 211 from the touch panel 118 and thereby controlling a program regarding a record pressing process stored in the ROM 113. While the MFP 101 is turned on, the CPU 111 repeatedly performs this operation flow at predetermined intervals (e.g., every second). Further, in FIG. 5, the description is given on the assumption that a history menu is displayed by long press of a history button.

In step S500, the CPU 111 determines whether the pressing of any of the history buttons 208 to 211 is detected. The process of step S500 is repeated until the pressing of any of the history buttons 208 to 211 is detected.

In step S501, the CPU 111 reads the setting contents 304 and the application type 302 of a history associated with the pressed button among the history buttons 208 to 211.

In step S502, the CPU 111 determines whether, since the pressing of any of the history buttons 208 to 211 has been detected, the history button remains pressed for a certain time (e.g., a second), thereby determining whether the long press of the history button is performed. If the history button remains pressed for the certain time (YES in step S502), the processing proceeds to step S503. If not (NO in step S502), the processing proceeds to step S508.

In step S503, the CPU 111 determines whether destination information is present in the setting contents 304. If destination information is present (YES in step S503), the processing proceeds to step S504. If, on the other hand, destination information is not present (NO in step S503), the processing proceeds to step S505. Based on the presence or absence of any setting content included in destination information, the presence or absence of destination information is determined. Specifically, the setting contents 304 of the history information 300 may be referenced, and based on whether destination information (e.g., "destination ID") is included in the setting contents 304, it may be determined whether destination information is present in the setting contents 304.

After it is determined in step S503 that destination information is present, then in step S504, the CPU 111 displays the history menu 403 on the display 119. As illustrated in FIG. 4B, the history menu 403 includes "call" 401, "delete" 402, "call only destinations" 404, and "call only settings" 405 as items.

After it is determined in step S503 that destination information is not present, then in step S505, the CPU 111 displays the history menu 400 on the display 119. As illustrated in FIG. 4A, the history menu 400 includes "call" 401 and "delete" 402.

In step S506, the CPU 111 acquires a pressing event performed by a user operation and determines whether the pressed area is the area of the history menu 403. If it is determined that the pressed area is the area of the history menu 403 (YES in step S506), the processing proceeds to step S507. If it is determined that the pressed area is other than the area of the history menu 403 (NO in step S506), the CPU 111 erases the history menu and ends this processing.

The aspect of the embodiments employs, as the method for erasing the history menu, a method for pressing an area other than that of the history menu. Alternatively, another method may be employed. For example, a method for providing on the history menu a button for erasing the history menu, or a method for, if a certain time elapses since the history menu has been displayed, erasing the history menu may be employed. The determination content in step S506 differs depending on which method is employed.

In step S507, the CPU 111 determines the type of a button pressed in step S506. If the button is "call" 401, the processing proceeds to step S508. If the button is "call only destinations" 404, the processing proceeds to step S509. If the button is "call only settings" 405, the processing proceeds to step S510. If the button is "delete" 402, the processing proceeds to step S512.

In step S508, the CPU 111 transmits the application type 302 and the setting contents 304 to an application that matches the read application type 302, and the processing proceeds to step S511.

In step S509, the CPU 111 transmits the application type 302, and the number of destinations, the destination, and the application type in the setting contents 304 to the application that matches the read application type 302.

In step S510, the CPU 111 transmits the application type 302, and the settings other than the number of destinations and the destination in the setting contents 304 to the application that matches the read application type 302.

In step S512, the CPU 111 deletes the history button pressed in step S500 and the history information 300 related to the history button.

In step S511, the application displays an application screen on a screen of the display 119 in the state where the setting values of various settings are reflected from the received setting contents 304. Then, the CPU 111 ends the sequential flow. The setting values reflected on the application screen differ depending on which button on the history menu is selected. This is processing from when a button on a history menu is pressed to when an application screen is displayed.

<Application Screen>

With reference to FIGS. 6A to 6D, a description is given of an application screen to be displayed by pressing a history button or an item on a history menu.

FIG. 6A is an example of an application screen 600 to be displayed by pressing the "call" 401 on the history menu 403 to be displayed by pressing the history button 209. On areas 601 to 605, the values of the setting contents 304 corresponding to the history ID "2" of the history information 300 are reflected. The application screen 600 is also displayed by pressing the history button 209 without displaying the history menu 403.

In the area 601, the number of destinations "3" and the destination "0312345678" are displayed. The area 601 means that a fax is transmitted to a total of three destinations including the destination "0312345678". In FIG. 6A, the remaining two destinations other than the destination "0312345678" are not displayed. The remaining two destinations are displayed by operating scroll boxes to the right of the area 601. The method for displaying the destinations is not limited to this form. Alternatively, for example, a form may be employed in which all a plurality of corresponding destinations is simultaneously displayed.

The area 602 is a button for changing the resolution. The area 603 is a button for changing the reading size. The area 604 is a button for changing the density. If the area 605 is pressed, a detailed screen (not illustrated) for displaying and changing the setting contents 304 other than the above setting contents and the setting values of the other setting contents 304 is displayed. Setting items in non-display states due to the area 605 and setting items in display states due to the areas 602 to 604 are not limited to the form in FIG. 6A.

The area 606 is a button for calling the address book. By calling the address book, it is possible to add or overwrite a destination to be displayed in the area 601. When a destination is input to the area 601, the user can manually input the destination without referencing the address book called by pressing the area 606. Further, when a plurality of destinations is input, a destination to be input by referencing the address book and a destination to be manually input can also be mixed together. If an area 619 is pressed, a process is executed based on the setting contents on the application screen 600.

FIG. 6B is an example of the application screen 600 to be displayed by pressing the "call only destinations" 404 on the history menu 403. Similar to FIG. 6A, in the area 601, the number of destinations "3" and the destination "0312345678" are displayed, but in the areas 602 to 605, default settings are displayed. Although not illustrated, default values are also set on the detailed screen to be displayed by pressing the area 605.

FIG. 6C is an example of the application screen 600 to be displayed by pressing the "call only settings" 405 on the history menu 403. Similar to FIG. 6A, in the areas 602 to 604, the setting values based on the setting contents 304 are set, but in the area 601, the number of destinations is "0", and the destination is blank. Although not illustrated, a detailed screen that is the same as the detailed screen to be displayed by pressing the area 605 in FIG. 6A is displayed.

FIG. 6D is an example of an application screen 610 to be displayed by pressing the history button 208 associated with the history with the history ID 301 "1". On areas 611 to 618, the values of the setting contents 304 corresponding to the history ID "1" of the history information 300 are reflected. In the area 611, the color mode selection "monochrome" is displayed. In the area 612, the magnification selection "125%" is displayed. In the area 613, the sheet size selection "A4" is displayed. In the area 614, the number-of-copies selection "5" is displayed.

In the area 615, the page aggregate selection "1 in 1" is displayed. In the area 616, the side selection "two sides to two sides" is displayed. In the area 617, the density selection "normal" is displayed. The setting values of the setting contents 304 other than the above setting contents are included in a screen to be displayed by pressing the area 618. Setting values included in the screen to be displayed by pressing the area 618 and setting values not included in the screen to be displayed by pressing the area 618 are not limited to the form in FIG. 6D.

According to the present exemplary embodiment, when a job that requires a destination is executed, a history menu corresponding to a selected history button is displayed, whereby it is possible to select whether to reflect only the same destination as an operation history or only setting contents other than the destination.

A second exemplary embodiment of the disclosure will be described below. As described in the first exemplary embodiment, examples of the method for setting the destination of a job include the method for setting the destination by manual input of the user (the destination type "new destination"), and the method for referencing the address book (the destination type "address book"). In the first method, the destination input by the user is directly saved in the "destination" in the setting contents 304. In the second method, however, a "destination ID" for referencing the address book is saved. Then, in the second method, if a corresponding destination is deleted from the address book as the reference destination, and even if the destination ID is saved in the history information 300, the destination is not referenced.

In the present exemplary embodiment, a description is given of the display form of a screen in a case where, even if the destination of a job becomes unable to be referenced, a corresponding history button remains displayed.

Figure 7:
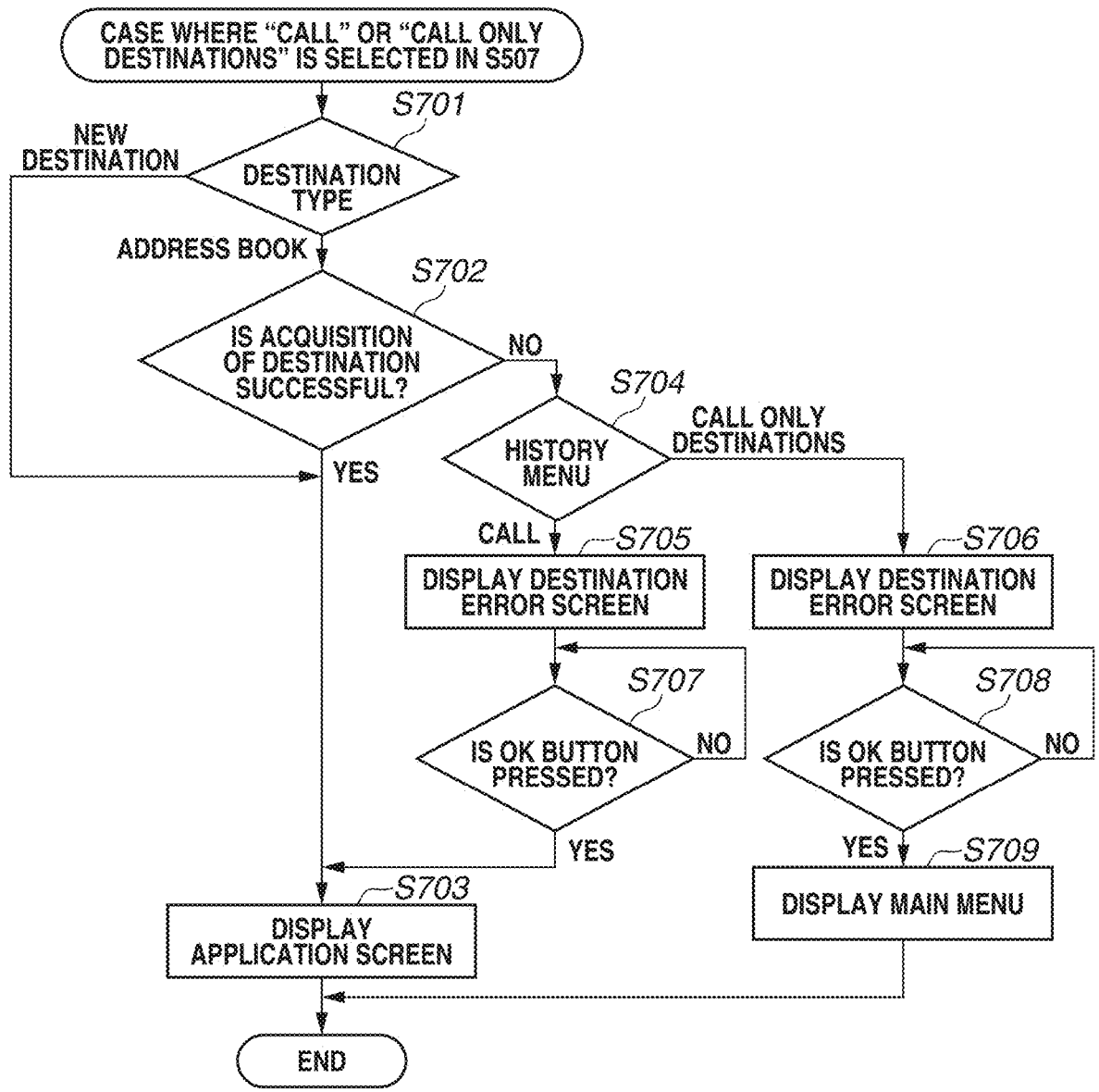
FIG. 7 is an operation flow of processing until a job is executed in a case where a destination in history information is deleted, according to a second exemplary embodiment of the disclosure.

FIG. 7 is the operation flow of processing in a case where, when any of the history buttons 209 to 211 is pressed in the MFP 101 according to the present exemplary embodiment, the destination in the setting contents 304 is already deleted. This operation flow is processing after the "call" 401 or the "call only destinations" 404 on the history menu 403 is selected in step S507 in FIG. 5.

In step S701, the CPU 111 determines whether the destination type in the setting contents 304 of the history information 300 is an "address book" or a "new destination". If it is determined that the destination type is an "address book", the processing proceeds to step S702. If it is determined that the destination type is a "new destination", the processing proceeds to step S703.

After it is determined in step S701 that the destination type is an "address book", then in step S702, the CPU 111 determines whether the acquisition of a destination is successful. If the acquisition of a destination is successful (YES in step S702), the processing proceeds to step S703. If the acquisition of a destination is not successful (NO in step S702), the processing proceeds to step S704. Also if a plurality of destinations is present and the acquisition of only some of the destinations is successful, the processing proceeds to step S703.

In step S703, the application displays an application screen on the screen of the display 119 in the state where the setting values of various settings are reflected from the received setting contents 304. Then, the CPU 111 ends the sequential flow. At this time, if the acquisition of some of the plurality of destinations is not successful, only the acquired destinations are reflected on the application screen.

Figures 8A, 8B:
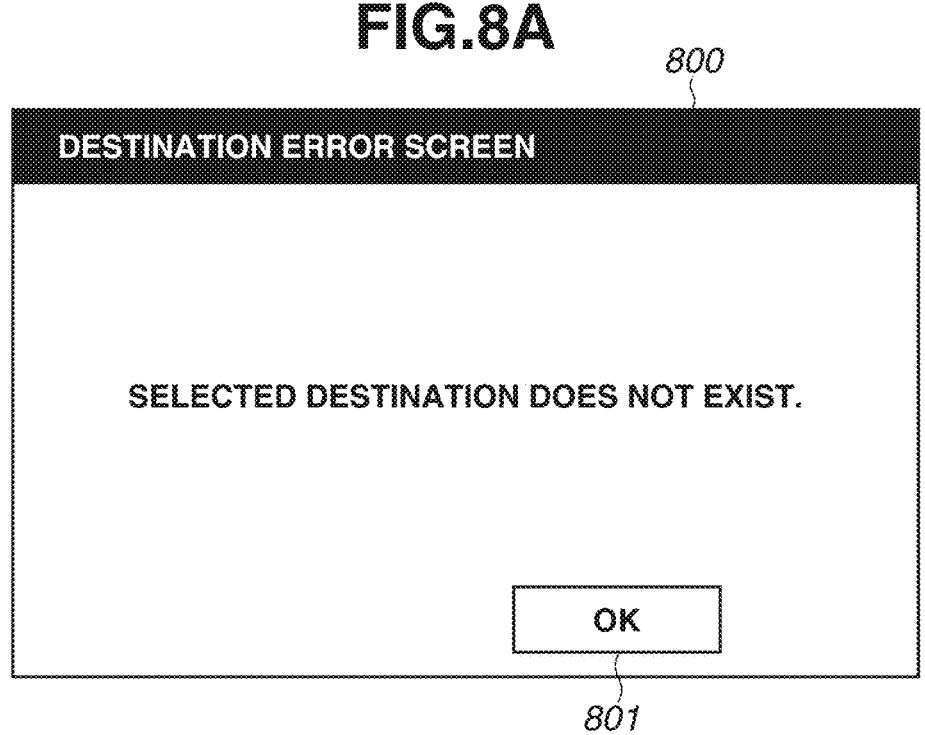
FIGS. 8A and 8B are diagrams illustrating examples of a destination error screen and an address book according to the second exemplary embodiment of the disclosure.

If the acquisition of a destination is not successful in step S702, then in step S704, the CPU 111 determines which of the "call" 401 and the "call only destinations" 404 the item pressed on the history menu 403 (step S507) is. If it is determined that the "call" 401 is pressed, then in step S705, the CPU 111 displays an error screen 800 (FIG. 8A). In step S707, the CPU 111 waits until an "OK" button 801 is pressed. If the "OK" button 801 is pressed (YES in step S707), the processing proceeds to step S703.

If, on the other hand, it is determined that "call only destinations" 404 is pressed, then in step S706, the CPU 111 displays the error screen 800. In step S708, the CPU 111 waits until the "OK" button 801 is pressed. If the "OK" button 801 is pressed (YES in step S708), the processing proceeds to step S709. In steps S705 and S706, the same error screen 800 is displayed, but different error screens may be displayed.

In step S709, the CPU 111 displays the home screen 200, which is a main menu. This is the display method for displaying a screen in a case where the destination cannot be referenced.

<Address Book>

An address book 820 in FIG. 8B is an example of a database stored in the RAM 112 or the ROM 113 according to the second exemplary embodiment. The address book 820 is referenced by pressing the "address book" 606 on the application screen 600.

A destination ID 821 indicates an ID for uniquely identifying a destination in the address book. An application type 822 stores "fax", "transmit (email)", and "scan and save". A destination 823 stores a telephone number if the application type 822 is "fax", stores an email address if the application type 822 is "transmit (email)", and stores a file path if the application type 822 is "scan and save". For example, information 824 is an example of a case where the application type 822 is "fax", and the telephone number is "0441234567". Information 825 is an example of the destination in a case where the application type 822 is "scan and save", and the file path to the save location of scan data is "/folder/abc/". Information 826 is an example of a case where the application type 822 is "transmit (email)", and the email address is "test@abc.com".

According to the present exemplary embodiment, even if the acquisition of a destination is not successful, but if the "call" 401 is pressed, then after an error screen is displayed, the setting contents other than the destination can be reflected, and the processing can be continued. If, on the other hand, the acquisition of a destination is not successful, and the "call only destinations" 404 is pressed, then after the error screen is displayed, the home screen 200 can be displayed.

A third exemplary embodiment of the disclosure will be described below. As illustrated in the number-of-destinations display area 209(b) and the destination display area 209(c) in FIG. 2, even if a plurality of destinations of fax is present, only a representative destination is displayed on a history button, and not all the plurality of destinations is displayed. This is because information that can be displayed on the history button is limited. Further, also on the application screen 600 displayed via a history menu, then to effectively utilize the display area, even if a plurality of destinations is present, not all the plurality of destinations is displayed. As a result, there is a possibility that the user executes a fax function without grasping all the plurality of destinations, and this leads to erroneous transmission.

In the present exemplary embodiment, a description is given of a form in which, in a case where "call" or "call only destinations" on a history menu is selected, and the process of transmitting a fax to a plurality of destinations is selected, the user is allowed to recognize the plurality of destinations.

FIG. 9 is the operation flow of processing in a case where any of the history buttons 209 to 211 is pressed in the MFP 101 according to the present exemplary embodiment, and a plurality of destinations is present in the setting contents 304. In this operation flow, processes are similar to those of steps S500 to S510 in FIG. 5, and therefore are not described here. This operation flow is processing after the "call" 401 or the "call only destinations" 404 on the history menu 403 is selected in step S507 in FIG. 5.

In step S901, the CPU 111 determines whether the number of destinations in the setting contents 304 of the history information 300 is two or more. If the number of destinations is two or more (YES in step S901), the processing proceeds to step S902. If not (NO in step S901), the processing proceeds to step S913.

In step S902, the CPU 111 determines whether destinations displayed on history buttons are the same. If it is determined that the destinations displayed on the history buttons are the same (YES in step S902), the processing proceeds to step S907. If it is determined that the destinations displayed on the history buttons are not the same (NO in step S902), the processing proceeds to step S903. If a plurality of destinations is present, a destination described at the beginning of "destination" in the setting contents 304 is displayed as a representative on a history button. Thus, for example, between a history button having a destination A and a destination B, and a history button having the destination A and a destination C, only the destination A is displayed on both history buttons even though only some of the destinations are the same. Thus, the destinations included in the respective history buttons cannot be distinguished from each other. As a result, this causes erroneous transmission as described in the issue of the present exemplary embodiment. Thus, the determination method as in step S902 is provided.

In step S903, the CPU 111 displays a destination list confirmation screen 1000 (FIG. 10A) that displays destinations in the setting contents 304. An area 1001 is an area where transmission destinations are displayed. In the area 1001, the destinations "0441234567", "0331234567", and "0661234567" are displayed. If a "cancel" button 1002 is pressed, the destination list confirmation screen 1000 transitions to the home screen 200. If an "OK" button 1003 is pressed, the destination list confirmation screen 1000 transitions to an application screen on which the selected destinations are reflected.

In step S904, the CPU 111 determines whether the pressing of either of the "cancel" button 1002 and the "OK" button 1003 is detected. If the pressing of either of the "cancel" button 1002 and the "OK" button 1003 is not detected (NO in step S904), the processing returns to step S904. If, on the other hand, the pressing of either of the "cancel" button 1002 and the "OK" button 1003 is detected (YES in step S904), the processing proceeds to step S905.

In step S905, the CPU 111 determines which of the "cancel" button 1002 and the "OK" button 1003 the button detected in step S904 is. If it is determined that the button is the "cancel" button 1002, the processing proceeds to step S906. If, on the other hand, it is determined that the button is the "OK" button 1003, the processing proceeds to step S913.

In step S906, the CPU 111 displays the home screen 200 and ends the sequential flow. In step S907, a destination list confirmation screen 1010 (FIG. 10B) including the same destinations (1011 and 1012) in the history information 300 is displayed. Then, the processing proceeds to step S908.

In step S908, the CPU 111 determines whether the selection of destinations on the destination list confirmation screen 1010 is detected. If the selection of destinations is detected (YES in step S908), the processing proceeds to step S909. If, on the other hand, the selection of destinations is not detected (NO in step S908), the processing returns to step S908.

The destination confirmation screens 1010 and 1000 are different from each other in that a plurality of destination selection candidates is displayed. The destinations 1011 are in the state where the destinations 1011 are currently selected. If the destinations 1011 are not destinations desired by the user, the other candidates 1012 can be selected. If the "call" 401 is selected on the history menu 403 and the destinations 1012 are selected on the destination confirmation screen 1010, execution conditions (the setting contents other than the destinations) to be reflected on the application screen 600 are execution conditions corresponding to the destinations 1012.

If a "cancel" button 1013 is pressed, the destination confirmation screen 1010 transitions to the home screen 200. If an "OK" button 1014 is pressed, the destination confirmation screen 1010 transitions to the application screen 600.

In step S909, the CPU 111 determines whether the pressing of either of the "cancel" button 1013 and the "OK" button 1014 is detected. If the pressing of either of the "cancel" button 1013 and the "OK" button 1014 is not detected (NO in step S909), the processing returns to step S909. If, on the other hand, the pressing of either of the "cancel" button 1013 and the "OK" button 1014 is detected (YES in step S909), the processing proceeds to step S910.

In step S910, the CPU 111 determines which of the "cancel" button 1013 and the "OK" button 1014 the button detected in step S909 is. If it is determined that the button is the "cancel" button 1013, the processing proceeds to step S911. If it is determined that the button is the "OK" button 1014, the processing proceeds to step S912.

In step S911, the CPU 111 displays the home screen 200 and ends the sequential flow.

In step S912, the CPU 111 transmits the application type 302 and the setting contents 304 to an application that matches the read application type 302, and the processing proceeds to step S913.

In step S913, the application reads the setting values of various settings from the received setting contents 304 and displays the application screen 600 (FIG. 6A, 6B) on the screen of the display 119 in the state where the settings are reflected. Then, the CPU 111 ends the sequential flow.

This is the flow for displaying a destination confirmation screen in a case where a plurality of destinations is present. This enables the user to confirm a plurality of destinations and then execute fax transmission.

<Other Embodiments>

In the first to third exemplary embodiments, a description has been given of a form in which, after a button on a history menu is pressed, an application screen is displayed, and a process corresponding to a history button is executed. Alternatively, a form may be employed in which, if a button on a history menu is pressed, a corresponding process is executed without displaying an application screen (an immediate execution mode).

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-170079, filed Sep. 11, 2018, which is hereby incorporated by reference herein in its entirety.

What is claimed is:

1. An apparatus having a function of transmitting image data for which image processing has been executed to a destination having been set, the apparatus comprising:

at least one processor and at least one memory coupled to the at least one processor, the at least one memory having stored thereon instructions, which, when executed by the at least one processor, cause the at least one processor to function as:

a displaying unit configured to display a software key based on processing of the function being executed, the software key being for giving an instruction to re-execute the processing of the function in accordance with an image processing setting regarding image processing of the executed processing and an image data transmission destination setting regarding a destination to which image data is to be transmitted, wherein, in response to receiving a first operation performed on the software key, a setting screen in which the image processing setting corresponding to the software key is reflected is opened, and the image data transmission destination setting corresponding to the software key is not reflected in the setting screen, and wherein, in response to receiving a second operation performed on the software key, a setting screen in which the image data transmission destination setting corresponding to the software key is reflected is opened, and the image processing setting corresponding to the software key is not reflected on the setting screen.

2. The apparatus according to claim 1, wherein the menu screen is displayed by long press of the software key, and wherein the menu screen includes an item for receiving the first operation or the second operation.

3. The apparatus according to claim 1, wherein in a case where the second operation is received and the image data transmission destination setting cannot be referenced, the setting screen in which the image data transmission destination setting corresponding to the software key is reflected is not displayed.

4. The apparatus according to claim 1, wherein in a case where a plurality of destinations is included in the image data transmission destination setting corresponding to the software key, a screen for confirming the destinations on the software key is displayed.

5. The apparatus according to claim 1, wherein, in the setting screen in which the image data transmission destination setting corresponding to the software key is reflected, a default destination is reflected.

6. The apparatus according to claim 1, wherein in response to receiving a third operation performed on the software key, the processing of the function is executed based on the image data transmission destination setting corresponding to the software key and the image processing setting corresponding to the software key.

7. The apparatus according to claim 1, wherein in response to receiving a third operation performed on the software key, a setting screen in which the image data transmission destination setting corresponding to the software key and the image processing setting corresponding to the software key are reflected is opened.

8. The apparatus according to claim 1, wherein, in response to receiving a tap operation performed on the software key, a setting screen in which the image data transmission destination setting corresponding to the software key and the image processing setting corresponding to the software key are reflected is opened, wherein, in response to receiving long press performed on the software key, a menu screen is opened, wherein, in response to receiving an operation of calling a destination in the menu screen, the setting screen in which the image data transmission destination setting corresponding to the software key is reflected is opened, and wherein, in response to receiving an operation of calling the image processing setting in the menu screen, the setting screen in which the image processing setting corresponding to the software key is reflected is opened.

9. The apparatus according to claim 1, wherein the image data transmission destination setting is an e-mail address or a telephone number.

10. The apparatus according to claim 1, wherein the image processing setting includes a document reading setting.

11. A method for controlling an apparatus having a function of transmitting image data for which image processing has been executed to a destination having been set, the method comprising:

displaying a software key based on processing of the function being executed, the software key being for giving an instruction to re-execute the processing of the function in accordance with an image processing setting regarding image processing of the executed processing and an image data transmission destination setting regarding a destination to which image data is to be transmitted, wherein, in response to receiving a first operation performed on the software key, a setting screen in which the image processing setting corresponding to the software key is reflected is opened, and the image data transmission destination setting corresponding to the software key is not reflected in the setting screen, and wherein, in response to receiving a second operation performed on the software key, a setting screen in which the image data transmission destination setting corresponding to the software key is reflected is opened, and the image processing setting corresponding to the software key is not reflected on the setting screen.

12. The method according to claim 11, wherein the menu screen is displayed by long press of the software key, and wherein the menu screen includes an item for receiving the first operation or the second operation.

13. The method according to claim 11, wherein in a case where a plurality of destinations is included in the image data transmission destination setting corresponding to the software key, a screen for confirming the destinations on the software key is displayed.

14. A non-transitory storage medium storing instructions that when executed by one or more processors control the one or more processors to operate as an apparatus having a function of transmitting image data for which image processing has been executed to a destination having been set, the apparatus comprising:

a display configured to display a software key display a software key based on processing of the function being executed, the software key being for giving an instruction to re-execute the processing of the function in accordance with an image processing setting regarding image processing of the executed processing and an image data transmission destination setting regarding a destination to which image data is to be transmitted, wherein, in response to receiving a first operation performed on the software key, a setting screen in which the image processing setting corresponding to the software key is reflected is opened, and the image data transmission destination setting corresponding to the software key is not reflected in the setting screen, and wherein, in response to receiving a second operation performed on the software key, a setting screen in which the image data transmission destination setting corresponding to the software key is reflected is opened, and the image processing setting corresponding to the software key is not reflected on the setting screen.

15. The non-transitory storage medium according to claim 14, wherein the menu screen is displayed by long press of the software key, and wherein the menu screen includes an item for receiving the first operation or the second operation.

16. The non-transitory storage medium according to claim 14, wherein in a case where a plurality of destinations is included in the image data transmission destination setting corresponding to the software key, a screen for confirming the destinations on the software key is displayed.

\* \* \* \* \*